United States Patent [19]
André et al.

[11] Patent Number: 6,125,033
[45] Date of Patent: *Sep. 26, 2000

[54] RECONFIGURABLE ENCLOSURE PANEL FOR A MOBILE COMPUTER

[75] Inventors: Bartley K. André, Menlo Park; Ken R. Weber, San Jose; Gwen M. Dreyer, Menlo Park; Lawrence Lam, San Jose; Masamichi Udagawa, San Francisco; John F. Larkin, Santa Clara; Susanne M. Pierce, San Francisco, all of Calif.

[73] Assignee: Apple Computer, Inc., Cupertino, Calif.

[ * ] Notice: This patent is subject to a terminal disclaimer.

[21] Appl. No.: 09/231,285

[22] Filed: Jan. 15, 1999

Related U.S. Application Data

[62] Division of application No. 08/851,692, May 6, 1997, Pat. No. 5,870,282, which is a continuation of application No. 08/528,693, Sep. 15, 1995, abandoned.

[51] Int. Cl.⁷ .......................................................... G06I 1/16
[52] U.S. Cl. ............................................................. 361/683
[58] Field of Search ........................ 361/683; 364/708.1; 248/636, 638

[56] References Cited

U.S. PATENT DOCUMENTS

| | | | |
|---|---|---|---|
| 4,986,763 | 1/1991 | Boyle ................................... | 361/681 X |
| 5,020,090 | 5/1991 | Morris . | |
| 5,072,998 | 12/1991 | Oh ........................................... | 312/204 |
| 5,124,887 | 6/1992 | Kobayashi .............................. | 361/685 |
| 5,196,991 | 3/1993 | Hsieh .................................. | 361/685 X |
| 5,251,105 | 10/1993 | Kobayashi et al. ...................... | 361/683 |
| 5,327,683 | 7/1994 | Chu .......................................... | 49/463 |
| 5,513,068 | 4/1996 | Girard ..................................... | 361/685 |

FOREIGN PATENT DOCUMENTS

| | | |
|---|---|---|
| 93108570 | 12/1993 | European Pat. Off. . |
| 92 10 899 | 4/1993 | Germany . |
| 92 08 019 U | 5/1993 | Germany . |
| 6274456 | 9/1994 | Japan . |

OTHER PUBLICATIONS

IBM Technical Disclosure Bulletin, vol. 37, No. 8, Aug. 1994, pp. 513–515, entitled "Plastic Cover Front Assembly".

IBM Technical Disclosure Bulletin, vol. 37, No. 8, Aug. 1994, pp. 627–630, entitled "Personal Computer Mechanical Package".

IBM Technical Disclosure Bulletin, vol. 33, No. 6A, Nov. 1995, pp. 154 and 155, entitled "Easily Attachable Machine Cover Set".

TINMAX Flower Flyer (Distributed Nov. 1994 at Comdex Trade Show).

*Primary Examiner*—Leo P. Picard
*Assistant Examiner*—John Reed
*Attorney, Agent, or Firm*—Blakely, Sokoloff, Taylor & Zafman

[57] ABSTRACT

Enclosure panel for a mobile computer, the enclosure panel including a panel housing coupled to a portion of the mobile computer. The enclosure panel can have cosmetic or functional attributes or both. To achieve cosmetic individuality, the enclosure panel housing is made of a durable substance like transparent or colorful plastic or stainless steel, or is covered by a textile, vinyl, leather, or elastomeric material. Functional attributes include enclosure panels with pouches for storage, additional electronic component configurability, a solar power source, or a transporting means. The enclosure panel housing is interchangeable with other enclosure panel housings, providing the user with reconfigurability of a mobile computer design.

18 Claims, 10 Drawing Sheets

RECONFIGURABLE ENCLOSURE PANEL FOR A MOBILE COMPUTER

This application is a division of Ser. No. 08/851,692 filed May 6, 1997, U.S. Pat. No. 5,870,282, which is a continuation of Ser. No. 08/528,693 filed Sep. 15, 1995, abandoned.

FIELD OF THE INVENTION

The invention relates generally to mobile computer housings and more particularly to cosmetic and functional enclosure panels for the exterior of mobile computer housings.

BACKGROUND OF THE INVENTION

A mobile or portable computer refers to any computer designed to be moved easily. Mobile or portable computers can be characterized by size and weight. Transportable, notebook, laptop, ultralight, and hand-held are terms used to describe mobile computers of various sizes and weights.

In general, a mobile computer has a computer screen attached and electronically linked to a computer assembly wherein the top of the computer assembly is covered by an electronic keyboard. A mobile computer generally folds-on to itself like a notebook for transport. More particularly, the mobile computer screen folds over onto the keyboard/computer to close the unit and prepare it for transport. Thus, in the closed position, the mobile computer generally has two planar surfaces; the housing protecting the screen (top planar surface) and the housing protecting the keyboard/computer (bottom planar surface).

The housing of a mobile computer, including the two planar surfaces, is generally made of a hard, durable plastic or plastic-like material. As noted, the housing serves to protect the electronic components inside the housing (i.e., the screen or the computer). In addition, the housing serves to seal the mobile computer unit in accordance with Federal Communications guidelines relating to electronic noise emissions.

The exterior hard, durable plastic housing of a mobile computer is similar for all types and brands of mobile computers. Popular colors of the plastic housings include grays and off-whites. There exists a need for mobile computer housings to express a form of cosmetic individuality. In addition to cosmetic individuality, there further exists a need for the housings to permit additional functionality beyond simply providing a protective, sealed encasing for the electronic components of the mobile computer.

SUMMARY AND OBJECTS OF THE INVENTION

The invention relates to an enclosure panel for a mobile computer. The enclosure panel includes a panel housing coupled to a portion of the mobile computer. In the preferred embodiment, there are enclosure panels on both planar surfaces of the mobile computer housing.

To achieve cosmetic individuality, the enclosure panel housing is made of hard, durable plastic or plastic-like material of various colors and textures, or other hard, durable materials like various forms of wood, e.g., oak, maple, and teak, or metal, e.g., stainless steel, chrome-plated, and silver-plated metals. The enclosure panel housing can further be of a hard, durable material that is covered on its visible side by any form of textile, including, but not limited to, cotton, canvas, polyester, wool, rayon, or other fiber, yarn, or fabric, vinyl or vinyl-like materials, neoprene, or other synthetic materials or textiles. The durable material of the enclosure panel housing can further be covered on its visible side with leather, cowhide, suede, or coach, or leather-like materials. The invention contemplates that these coverings are attached to the enclosure panel housing. Methods of attachment include, but are not limited to, glue, heat, or mechanical means, e.g., staples or tacks.

The invention also contemplates functional uses for the enclosure panels. The enclosure panel housing can include padding material to offer protection to the delicate computer components while the mobile computer is in transport. The padding material is either attached directly to the enclosure panel housing or contained between the textile or leather or leather-like materials and the durable enclosure panel housing that the former covers. Examples of padding material include, but are not limited to, styrene, polystyrene, cotton, rubber, gel, or air.

Other functional uses for the enclosure panels of the invention include the addition of a pouch or pouches of various sizes. The pouch or pouches serve a storage function by providing physical space to store components, including, but not limited to, computer disks, CD-ROM disks, DAT tapes, battery packs, business cards, documents, manuals, or books of various sizes. The pouch or pouches can also serve a configuring function whereby the pouch or pouches house an electronic component, like a CD-ROM drive or audio speaker, that is or can be in electronic communication with the mobile computer. In either the storing or configuring function, the pouch is attached to the enclosure panel housing or part of the textile, plastic, vinyl or leather or other material that covers the enclosure panel housing. In an embodiment wherein the enclosure panel housing is made of transparent plastic, the enclosure panel itself may serve as the pouch for holding thin objects, like photographs or business cards.

Another functional use for the enclosure panels is providing power to the mobile computer by accessing the solar power of the sun. In this embodiment, the enclosure panel housing includes a solar panel or solar panels that are in electrical communication with the mobile computer. The solar panels harness the energy of the sun and convert that energy to electricity to run the mobile computer or charge a battery.

A further functional use for the enclosure panels is providing a carrying means for the mobile computer. Specifically, the enclosure panels have fasteners in this embodiment by which a strap can be connected whereby the strap can be used as a carrying means.

The enclosure panel housings described, both cosmetic and functional, are interchangeable. For example, if an owner desired to change from one color enclosure panel housing to another or from one textile to another, the invention contemplates that the enclosure panel housing can be removed and replaced with another panel housing without damage to the enclosure panel or the mobile computer.

BRIEF DESCRIPTION OF THE DRAWINGS

The invention is illustrated by way of example and not limitation in the figures of the accompanying drawings, in which like references indicate similar elements and in which.

DETAILED DESCRIPTION

Figure 1:
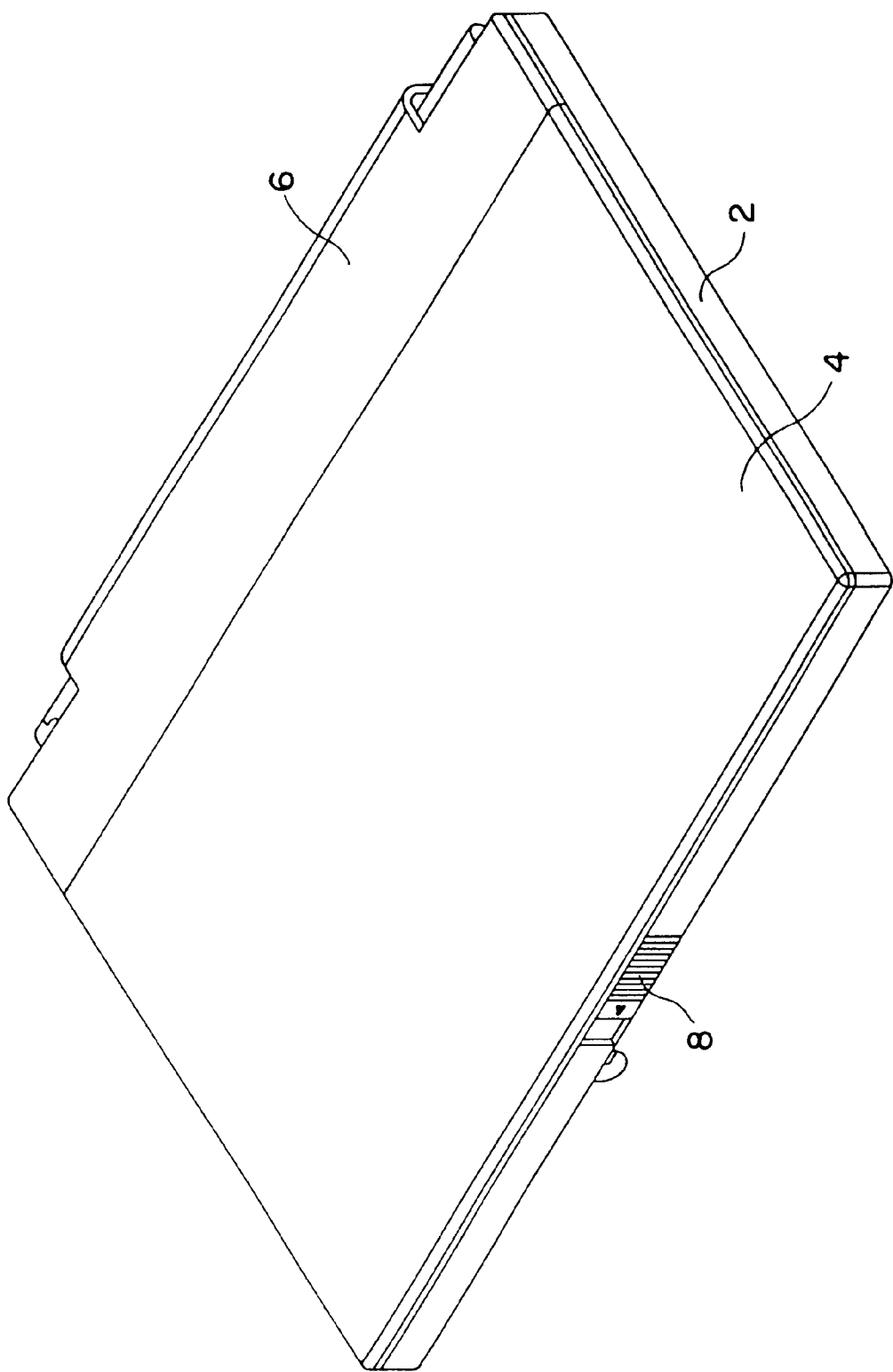
FIG. 1 is a top view of an enclosure panel and a spine attached to the top of a mobile computer.

The invention relates to an enclosure panel for a mobile computer that is either completely cosmetic or has cosmetic and functional elements. The enclosure panel housing includes a panel housing coupled to a portion of the mobile computer. In the preferred embodiment, the enclosure panel includes a bezel coupled to a portion of the mobile computer, an attachment plate coupled to the plate, and a panel housing coupled to the attachment plate. In the preferred embodiment, an enclosure panel is attached to each planar surface of the exterior of the mobile computer housing.

The enclosure panel housing is made of a hard, durable material, including, but not limited to, all forms of hard durable plastic, wood, or metal. The enclosure panel housing has a thickness ranging from 0.1 to 20 millimeters. The enclosure panel housing can be the visible part of the enclosure panel. For instance, the enclosure panel can be made of aluminum, stainless steel, or chrome-plated sheet metal to provide a cosmetically or aesthetically pleasing appearance to the planar surfaces of the computer housing. The enclosure panel can also contain cosmetically or aesthetically pleasing texture, like ridges, ribs, corrugations, or other depressions or protuberances. Further, the enclosure panel can be such that it can be painted with a picture or design.

The enclosure panel can also be made of transparent or various colored hard, durable plastic with or without cosmetically or aesthetically pleasing texture. For instance, the enclosure panel might be completely or partially transparent, or red or purple, or a combination like red, white, and blue, or black and white. Likewise, a plastic enclosure panel housing can be such that it can be painted or colored with a design or picture. The color schemes of the instant invention differ markedly from the dull gray or off-white mobile computer housings currently available.

The enclosure panel housing can also be covered, particularly on its visible sides, with a material that serves cosmetic or functional purposes. Those coverings that serve cosmetic purposes, include textiles, leather or leather-like materials, vinyl or vinyl-like materials, and elastomeric materials. More specifically, textiles contemplated for covering the enclosure panel include, but are not limited to, cotton, canvas, polyester, wool, rayon, or other fabric, fiber, or yarn. Leather or leather-like materials include all forms of leather, including, but not limited to, cowhide, suede, and coach. Vinyl or vinyl-like materials include, but are not limited to, polyvinyl cloth, textured vinyl, and woven vinyl. Elastomeric materials include, but are not limited to, neoprene, latex, rubber, and butyl rubber. These materials may be of any color, may be plain or designed, or may be a mix of colors or designs.

The invention contemplates that the enclosure panel housing can have functional aspects including padding, storage, accessory space, energy supply, and carrying means. For padding functionality, the invention contemplates that a space between the enclosure panel housing cover and the enclosure panel housing is occupied or filled with padding material. Cosmetically pleasing padding material can also be coupled directly to the enclosure panel housing and not hidden under the enclosure panel housing cover. The padding material provides padding or cushion to the computer housing to protect the sensitive computer components. Examples of padding material include, but are not limited to, air, cotton, polystyrene filler or other synthetic or natural fiber filler, natural and synthetic rubber, gel material, non-reinforced vinyl, urethane, acrylic, crushable expanded polystyrene foam, membrane enclosed particles like sand, and other materials used for shock and vibration mounting.

Another functional aspect of the enclosure panel is storage. The invention contemplates that the enclosure panel housing can itself serve a storage function or can contain a storage pouch or pouches. The enclosure panel housing can serve a storage function, for example, where the panel housing is made of a transparent material capable of housing photographs, letters, or business cards. The enclosure panel housing can also contain a pouch or pouches. The storage pouch or pouches are capable of storing data disks, CD-ROMs, DAT tapes, and battery packs. A storage pouch or pouches can instead or also be capable of storing business cards, photographs, documents, books, computer manuals, keys money, or credit cards. Examples of pouch or pouches coupled to the enclosure panel housing include textile, vinyl, rubber, or plastic colored or transparent pouches or textiles, vinyl, rubber, or plastic fish-net pouches. A more specific example is a transparent plastic pouch that is sealed to the enclosure panel housing on three sides so that a sheet or sheets of information or pictures or photographs are slid between the transparent pouch and the enclosure panel housing.

The storage pouch or pouches can also be part of the covering that covers the enclosure panel. In this embodiment, for instance, a covering that is plastic includes a pouch or pouches that may or may not have a closure means. Typical closure means include, hook and loop type fasteners, zippers, or VELCRO®. Another example of pouch on the covering of the enclosure panel is denim that contains a pouch or pouches that are shaped like the rear pockets of a pair of trousers. A further example is a covering of the enclosure panel that is leather with a pouch or pouches with hook and loop type fasteners that resemble a saddle bag.

In addition to storage, the enclosure panel housing can also provide accessory space for components that may be operated by the mobile computer. For instance, the invention contemplates that the enclosure panel housing includes a pouch or pouches for lodging components that can be electronically linked and operated from their accessory pouch. Examples of such components include CD-ROM or DAT drives, power supplies, and audio speakers. Electronic linking means include, but are not limited to, a cable connection between the electronic component and the mobile computer.

A further functional use for the enclosure panels is providing power to the mobile computer by accessing the solar power of the sun. In this embodiment, the enclosure panel housing includes a solar panel or solar panels that are in electrical communication with the mobile computer. The solar panel or panels harness the energy of the sun and convert that energy to electricity to run the mobile computer. Instead of being capable of operating the mobile computer directly, the solar panel or panels may also be used to charge the battery of the mobile computer so that a power source that is a battery is available to power the mobile computer.

Another functional aspect of the enclosure panels are to provide a carrying means. In this embodiment, the enclosure panel includes fasteners that attach to a strap or straps to add a holding or carrying mechanism directly to the mobile computer. The fasteners may be coupled directly to the enclosure panel housing or to the covering that covers the enclosure panel. The coupling of a strap to the fasteners permits the mobile computer to resemble a brief case, purse, or satchel that can be transported by the strap.

The invention contemplates that the enclosure panel housings are interchangeable such that a user can change, for example, from chrome-plated cosmetic enclosure panel housings to vinyl covered enclosure panel housings with functional storage pouches. The invention contemplates that the enclosure panel housings can be quickly and easily removed and replaced without damage to the enclosure panels or the mobile computer.

Further, the invention contemplates that the enclosure panel includes a locking mechanism to thwart, hinder, or prevent the removal of an enclosure panel from the mobile computer. The locking mechanism contemplated is compatible with all forms of enclosure panel housings.

FIG. 1 presents a top view of an enclosure panel coupled to the top planar surface of a mobile computer. FIG. 1 shows the top planar surface portion of the mobile computer housing 2 that generally houses the computer screen. An enclosure panel 4 is coupled directly to the planar surface portion of the mobile computer housing 2.

FIG. 1 presents an embodiment wherein the enclosure panel 4 does not cover the entire planar surface portion of the mobile computer housing 2, but instead is adjacent to an optional spine 6. The spine 6 is utilized to maintain the rotation tolerances associated with the axis of rotation of some mobile computer housings. The rotation tolerances are particularly an issue with respect to the enclosure panels that offer functional attributes like padding, storage, or accessory space. These functional enclosure panels are thicker or wider and, without the inclusion of the spine 6, the panels might interfere with the rotation of the mobile computer housing 2, and thus the available positioning of the computer screen. The spine 6 is a hard, durable material, for example, plastic or metal, that has a thickness ranging from approximately 0.1 to 20 millimeters. In the preferred embodiment, the spine 6 is made up a cosmetic spine cover attached to a base plate that is either coupled to the planar surface of the mobile computer housing or is molded as part of the computer housing. The cosmetic spine cover can be comprised of any of the materials that make up or cover the enclosure panel housing.

FIG. 1 also presents a slide and latch locking mechanism 8 typically associated with securing the top and bottom housing portions of a mobile computer, particularly the Apple® mobile computers. The invention contemplates that the same locking mechanism 8 that secures the separate housing positions also secures the enclosure panel 4 to the mobile computer housing 2. The locking mechanism is described in detail with reference to FIG. 2.

Figure 2:
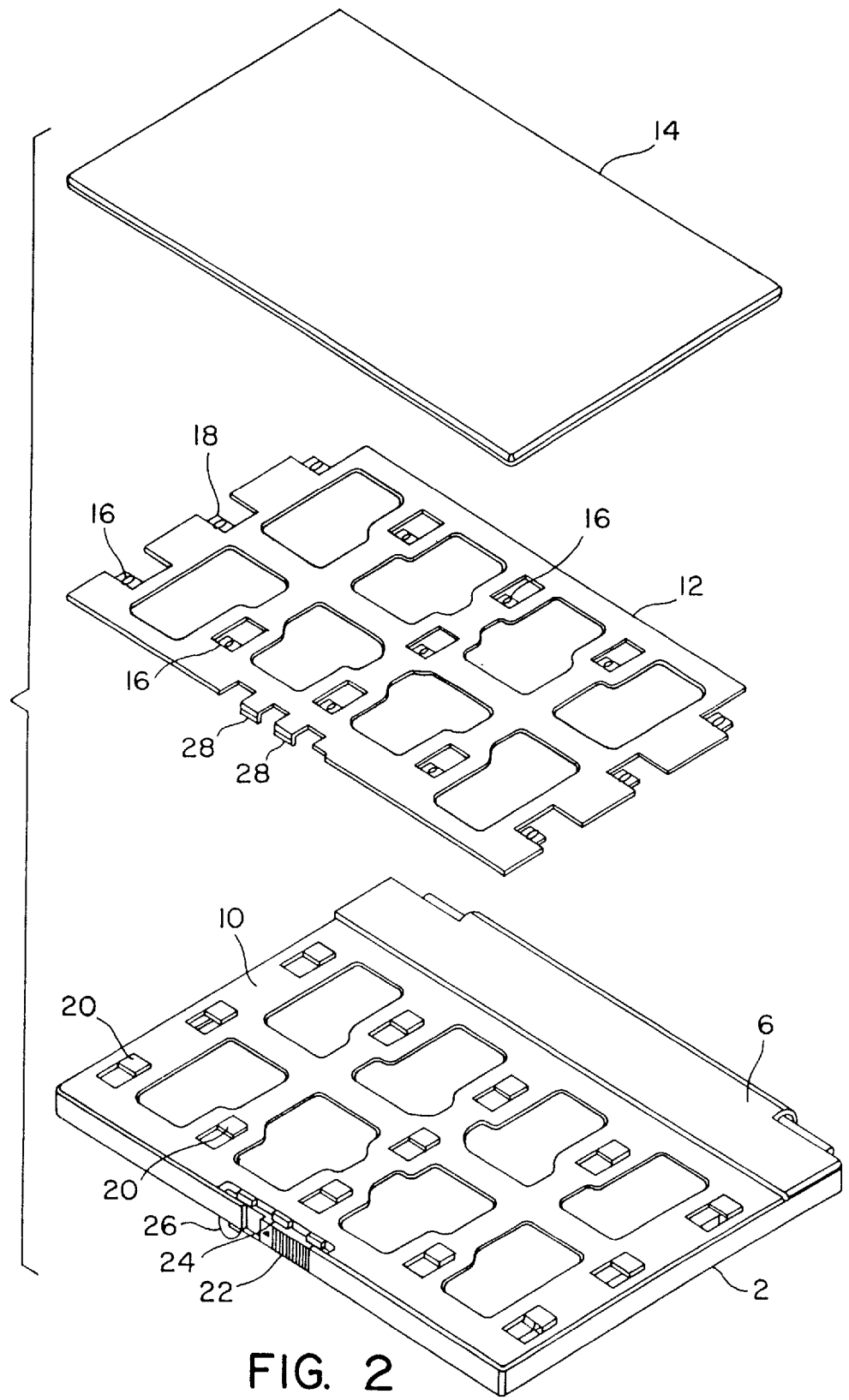
FIG. 2 is an exploded view of the enclosure panel of the invention.

FIG. 2 presents an exploded view of the enclosure panel assembly of the invention attached to the top planar portion of a mobile computer housing. FIG. 2 shows a bezel 10 coupled to the top planar portion of the mobile computer housing 2. In the preferred embodiment, the bezel is not a separate piece, but is molded as part of the planar portion of the computer housing. FIG. 2 also shows an attachment plate 12 coupled to the bezel 10, and an enclosure panel housing 14 coupled to the attachment plate 12. The enclosure panel housing has a thickness ranging from approximately 0.1 to 2 millimeters. In a preferred embodiment, the bottom portion of the enclosure panel housing 14 is glued to the attachment plate 12. It will be recognized by a person of ordinary skill in the art that other coupling devices (e.g., heat, melting, staples, etc.) can serve to couple the attachment plate 12 to the panel housing 14 none of which deviate from the spirit and scope of the invention.

The coupling of the attachment plate 12 to the bezel 10 is removable so as to make the enclosure panel housings 14 interchangeable or reconfigurable. The preferred coupling mechanism of the panel housing 14/attachment plate 12 to the bezel 10 demonstrated in FIG. 2 uses a drop and slide engagement mechanism. The attachment plate 12 contains several fingers 16 with depressions 18. The fingers 16 of the attachment plate 12 correspond to similar slightly elevated bezel fingers 20 in the bezel 10. The bezel fingers 20 each contain protuberances that correspond to the depressions 18 in the attachment plate fingers 16. The drop and slide coupling mechanism of the panel housing 14/attachment plate 12 to the bezel 10 proceeds as follows. First, the panel housing 14/attachment plate 12 is dropped or placed on the bezel 10, so that the panel housing 14/attachment plate 12 extends slightly beyond the front portion of the planar surface portion of the mobile computer housing 2. Next, the panel housing 14/attachment plate 12 is slid toward the back portion of the planar surface portion of the mobile computer housing 2. The sliding motion forces the attachment plate fingers 16 to slide under the bezel fingers 20 until the depressions 18 in the attachment plate fingers 16 align with the protuberances in the bezel fingers 20 to fasten the attachment plate 12 to the bezel 10.

The drop and slide method described above presents a preferred embodiment of attaching the attachment plate 12 to the bezel 10. One of ordinary skill in the art would recognize that the depression/protuberance finger configuration could be reversed as could the positioning of the attachment plate fingers 16 relative to the bezel fingers 20 (i.e., the attachment plate fingers 16 can be above the bezel fingers 20 relative to the plane of the bezel 10). Other attachment mechanisms are also contemplated. One such alternative attachment mechanism involves snaps on the edges of the attachment plate that snap into corresponding sockets in the bezel. Thus, a person of ordinary skill in the art would recognize that there are many attachment mechanisms none of which deviate from the spirit and scope of the invention.

FIG. 2 also presents a view of the locking mechanism that further secures the enclosure panel to the top planar portion of the mobile computer housing 2. The particular locking mechanism depicted includes a two-position, slidable latch 22 attached to a hook 26 that secures separate computer housing portions together in the closed position. The two-positions of the latch 22 are the rest position and the release position and spring tension on the latch 22 makes the latch 22 favor the rest position. The latch 22 contains several ribs 24. In the rest position, the ribs 24 in the latch 22 block the teeth 28 in the attachment plate 12 from moving past the latch 22. When the latch 22 is slid to the release position, the locking mechanism reveals a small hole behind the latch 22. A thin object, like a small screw driver or wire, can be placed in the hole to hold the latch 22 in its release position. When the latch 22 is in the release position, the teeth 28 in the attachment plate are no longer blocked by the attachment plate 12 and the panel housing 14/attachment plate 12 can be removed from the bezel by forcibly sliding the panel housing 14/attachment plate 12 toward the front portion of the mobile computer housing 2 (to disengage the attachment plate fingers 16 from the bezel fingers 20), and lifting the panel housing 14/attachment plate 12 away from the bezel 10.

As with the attachment mechanism, a person of ordinary skill in the art would recognize that there are many types of locking mechanisms that could be utilized to secure the enclosure panel to the mobile computer without deviating from the spirit and scope of the invention. Thus, the invention is not limited to the particular locking mechanism described above.

Figure 3:
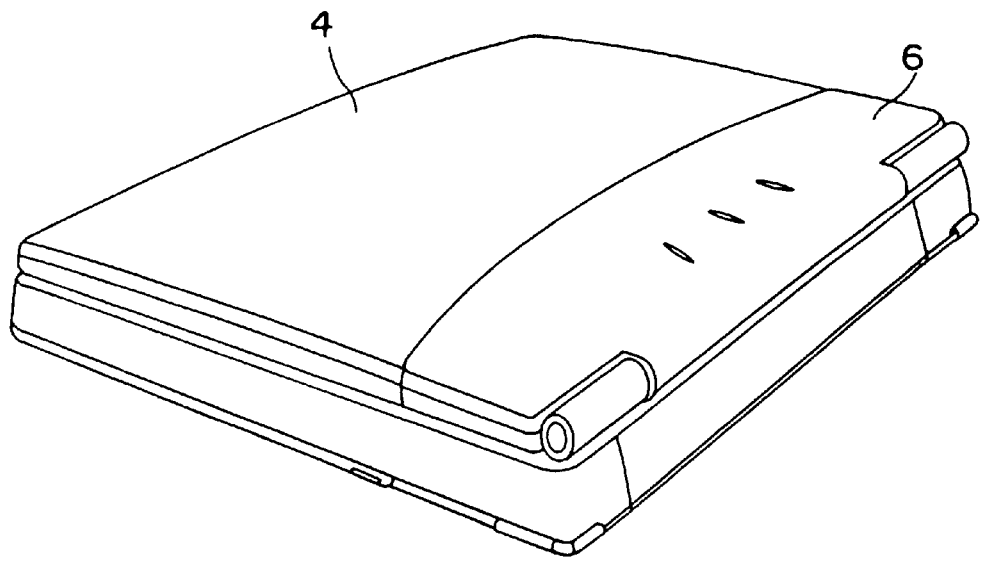
FIG. 3 is a top view of an enclosure panel with an enclosure panel housing that is covered with leather, vinyl, or a textile.

FIG. 3 presents a top view of an enclosure panel with an enclosure panel housing that is covered with leather, vinyl, or a textile. It is evident from FIG. 3 that only the top or visible portion of the enclosure panel housing need be covered with a covering material, since the bottom portion of the enclosure panel housing is coupled to an attachment plate wherein the attachment plate is further coupled to the bezel. Thus, the invention contemplates that the material covering the enclosure panel housing need not cover or surround the entirety of the enclosure panel housing.

Figure 4:
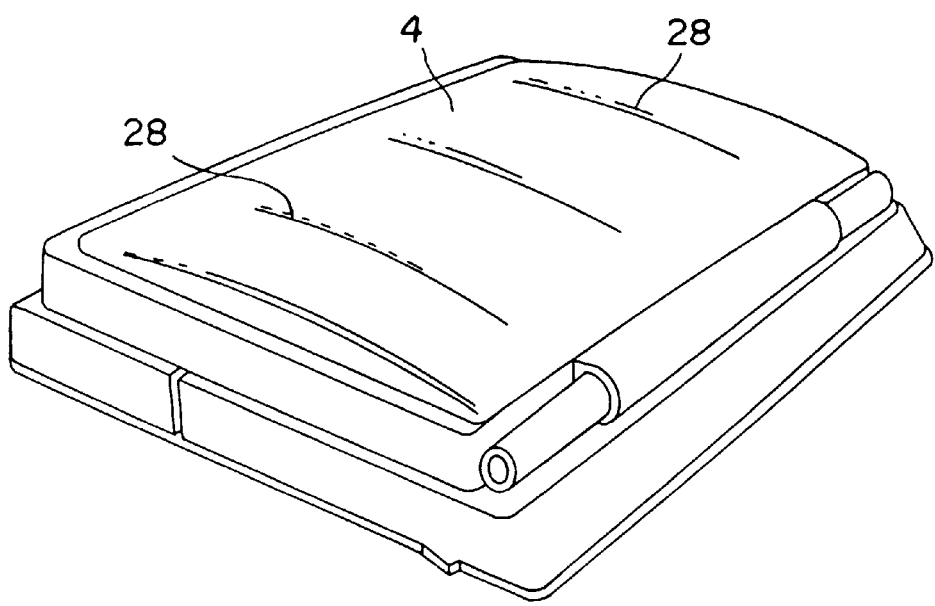
FIG. 4 is a top view of a cosmetic enclosure panel attached to the top of a mobile computer.

FIG. 4 shows a top view of another embodiment of the enclosure panel. In FIG. 4, the enclosure panel housing contains ridges 28 to offer more individuality to the design. The presentation depicted in FIG. 4 lacks a spine portion. The enclosure panel 4 covers the entire top planar portion of the mobile computer housing. The invention contemplates enclosure embodiments that cover the entire planar surface of a mobile computer or combine with a spine to cover the entire planar surface of a mobile computer.

FIGS. 1 through 4 present an enclosure panel attached to the planar surface of the mobile computer housing that typically houses the mobile computer screen. The invention contemplates that a similar enclosure panel can similarly be attached to the other (bottom) planar surface of the mobile computer housing that typically houses the computer and the keyboard. In an embodiment, the enclosure panels that are coupled to either of the planar surfaces are interchangeable. In another embodiment, the enclosure panel attached to the bottom planar surface portion of the mobile computer housing has grommets that protrude from the enclosure panel to prevent contact between the enclosure panel and a surface when the mobile computer is placed on a surface with the bottom planar surface of the mobile computer adjacent to the surface. In another embodiment, a locking mechanism is included to further secure the enclosure panel to the bottom planar portion of the mobile computer housing. The locking mechanism may or may not be compatible with the locking mechanism for the top planar portion of the mobile computer housing.

Figure 5:
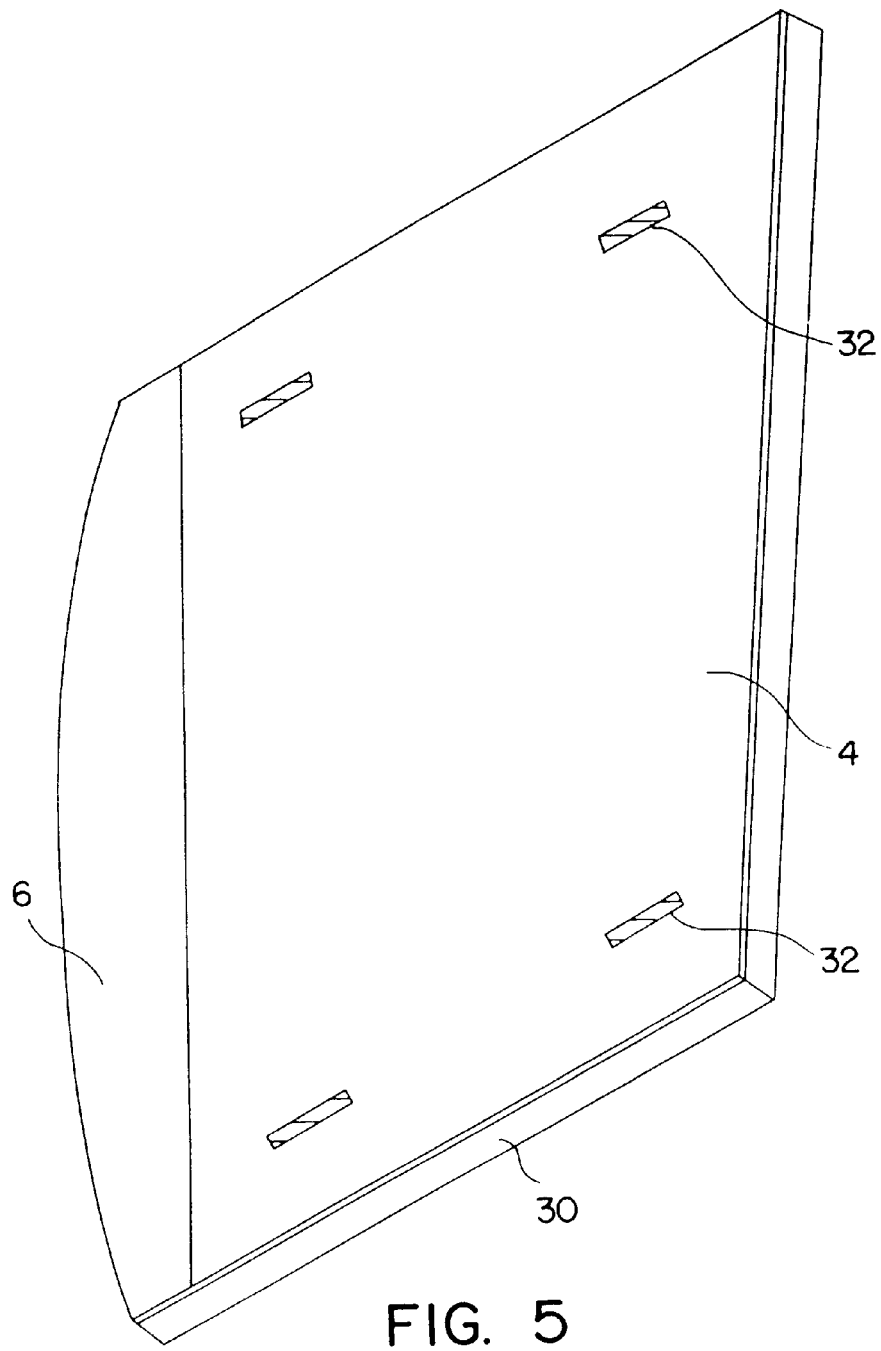
FIG. 5 is a bottom view of an enclosure panel and a spine attached to the bottom planar surface portion of a mobile computer.

FIG. 5 presents a bottom view of an enclosure panel 4 and a spine 6 attached to the bottom planar surface portion of the mobile computer housing 30. The enclosure panel 4 depicted includes four grommets 32 coupled to the enclosure panel 4. The grommets 32, rather than the enclosure panel 4, rest on a surface when the bottom planar surface of the mobile computer housing 30 is placed adjacent to a surface like a table-top or desk. The grommets 32 are made of a durable material, including, but not limited to, plastic or rubber.

Figure 6:
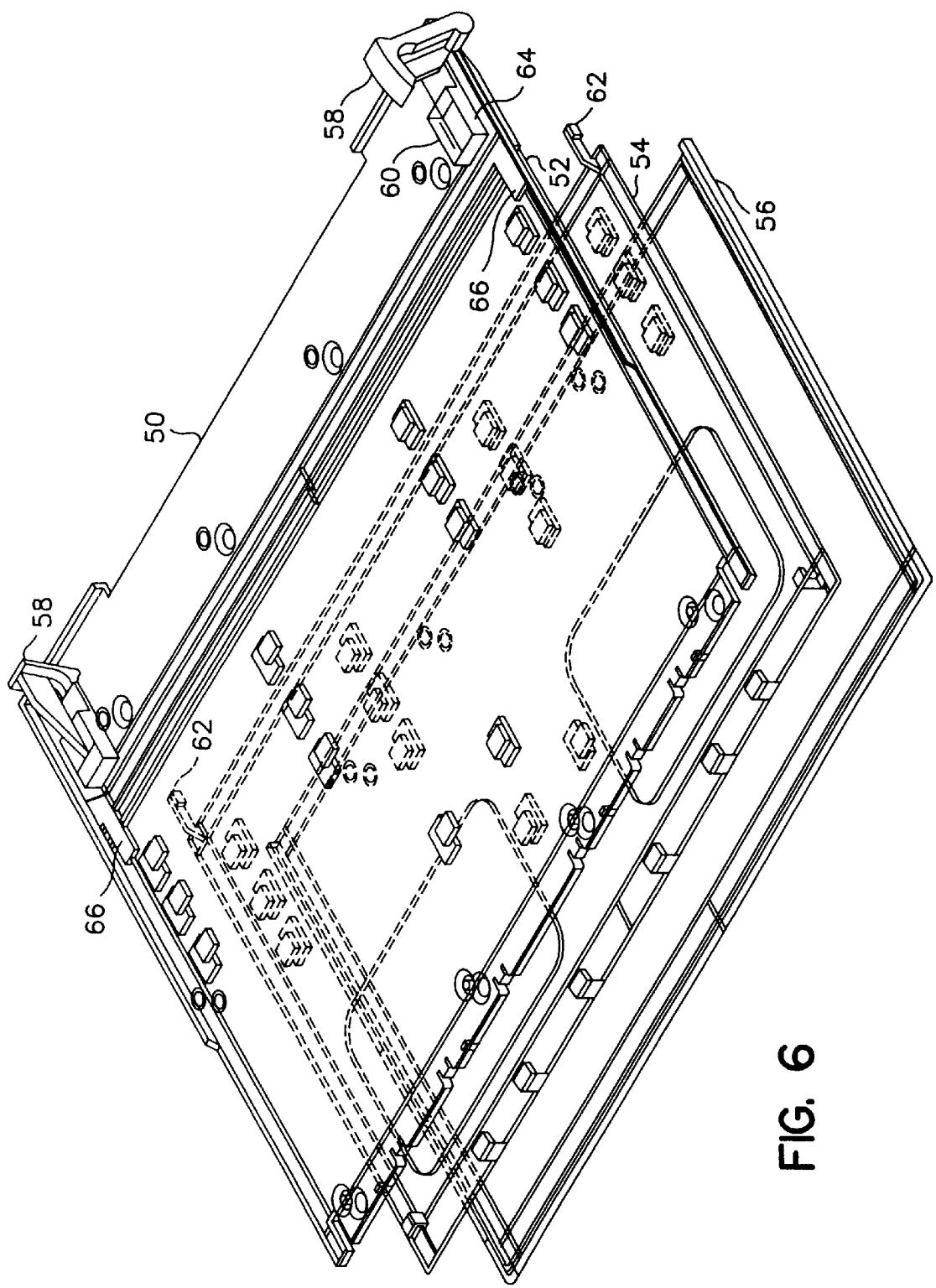
FIG. 6 is an exploded view of an enclosure panel attached to the bottom planar surface portion of a mobile computer.

FIG. 6 presents an exploded view of an enclosure panel attached to the bottom planar surface portion of the mobile computer housing 50 of an Apple® mobile computer. FIG. 6 shows a bezel 52 that is molded as part of the bottom planar portion of the mobile computer housing 50, an attachment plate 54 coupled to the bezel 52, and an enclosure panel housing 56 coupled to the attachment plate 54. The coupling of the attachment plate 54 to the bezel 52 is removable so as to make the enclosure panel housing 56 interchangeable or reconfigurable.

FIG. 6 also illustrates a preferred attachment and locking mechanism that is compatible with the particular mobile computer design presented, to attach and secure the enclosure panel to the bottom planar portion of the mobile computer housing 50. The mobile computer presented includes two manually operated retractable feet 58 that, when extended, raise or prop up the rear portion of the mobile computer when the bottom planar portion of the mobile computer 50 rests on a flat surface. In the non-extended position, each foot 58 is seated in a well 60 in the bottom planar portion 50 of the mobile computer so that no portion of the feet 58 extends below the plane defined by the bottom planar surface portion 50 of the mobile computer. The exterior wall of each well 60 contains a small hole 64.

The top surface of the attachment plate 54, relative to the bottom planar surface 50 of the mobile computer, includes two protruding cantilever snaps 62 that extend from the rear portion of the attachment plate 54. The rear portion of the bezel 52 has two voids 66 corresponding to, but shorter than, the length of the cantilever snaps 62 of the attachment plate 54. The coupling and locking of the attachment plate 54 (with the enclosure panel housing 56) to the bezel 52 proceeds in the following manner. First, the cantilever snaps 62 of the attachment plate 54 are inserted into the voids 66 of the bezel 52. The attachment plate 54 is then rotated to a position parallel to and slightly forward of the bezel 52 and the coupling proceeds by the preferred (drop and slide) engagement mechanism described in detail with reference to FIG. 2, whereby depressions in attachment plate fingers align with protuberances in bezel fingers to fasten the attachment plate 54 to the bezel 52. In the fastened or coupled position, the cantilever snaps 62 align with the small holes 64 in each foot well 60 to lock the attachment plate 54 (with the enclosure panel housing 56) to the bezel 52. To release the attachment plate 54 from the bezel 52, the feet 58 are extended, and a thin object, like a small screw driver, is used to push each cantilever snap 62 away from the corresponding well wall. The attachment plate 54 (with the enclosure panel 56) can then be detached from the bezel by forcibly sliding the attachment plate 54 toward the front portion of the mobile computer.

Figure 7:
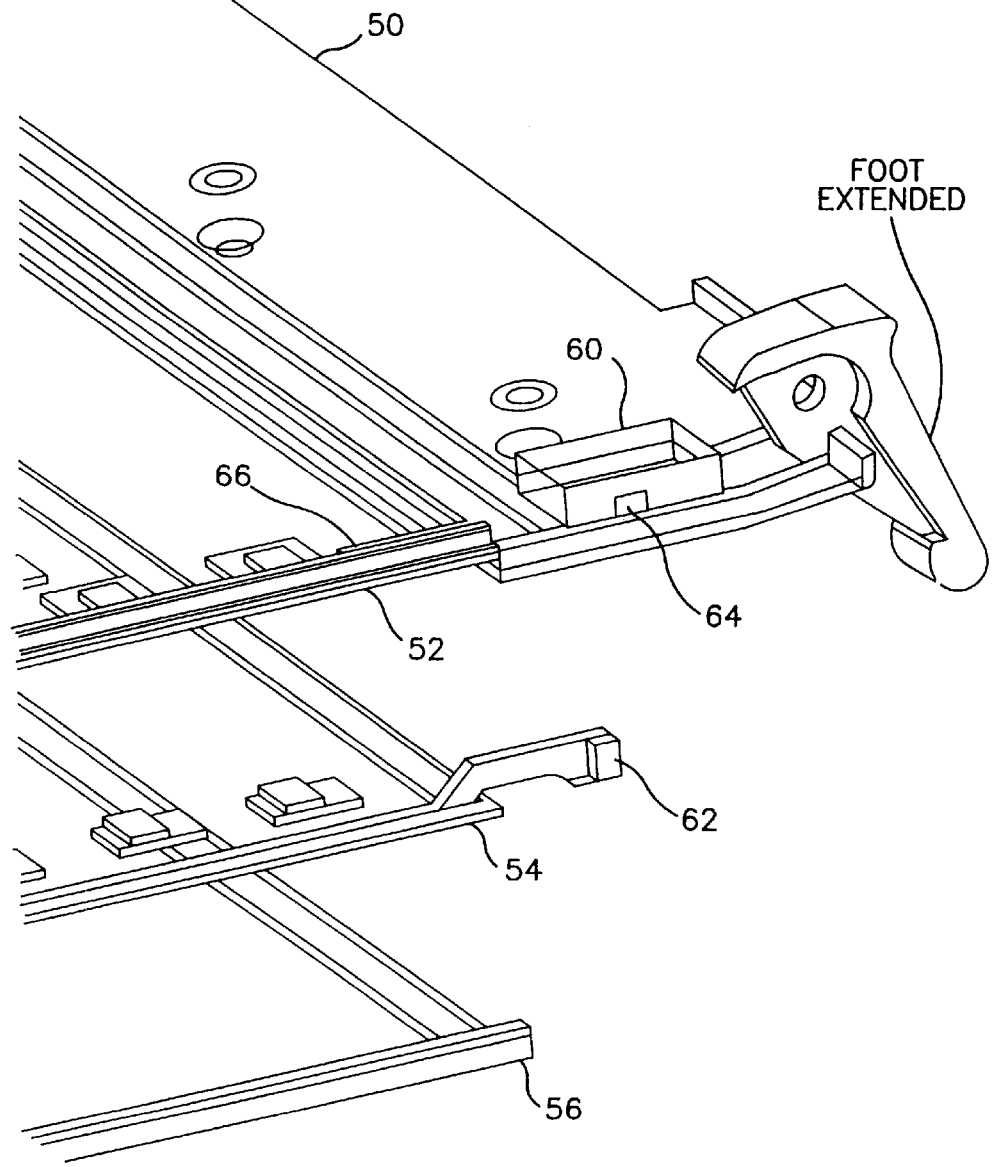
FIG. 7 is a magnified exploded view of the attachment and locking mechanism of an enclosure panel attached to the bottom planar surface portion of a mobile computer.

FIG. 7 presents a magnified exploded view of the locking mechanism described above. FIG. 7 shows a foot well 60 with a hole 64 in its exterior wall. The cantilever snap 62 of the attachment plate 54 is inserted through the void 66 in the bezel 52, the attachment plate 54 is rotated to a position parallel with the bezel 52, and the attachment plate 54 is forcibly slid toward the rear of the mobile computer wherein the cantilever snap 62 aligns with the hole 64 in the wall of the foot well 60.

As with the attachment and locking mechanism for the top planar portion of the mobile computer, a person of ordinary skill in the art would recognize that there are many types of attachment and locking mechanisms that could be used to secure an enclosure panel to the mobile computer without deviating from the spirit and scope of the invention. Thus, the invention is not limited to the particular attachment and locking mechanism described above.

Figure 8:
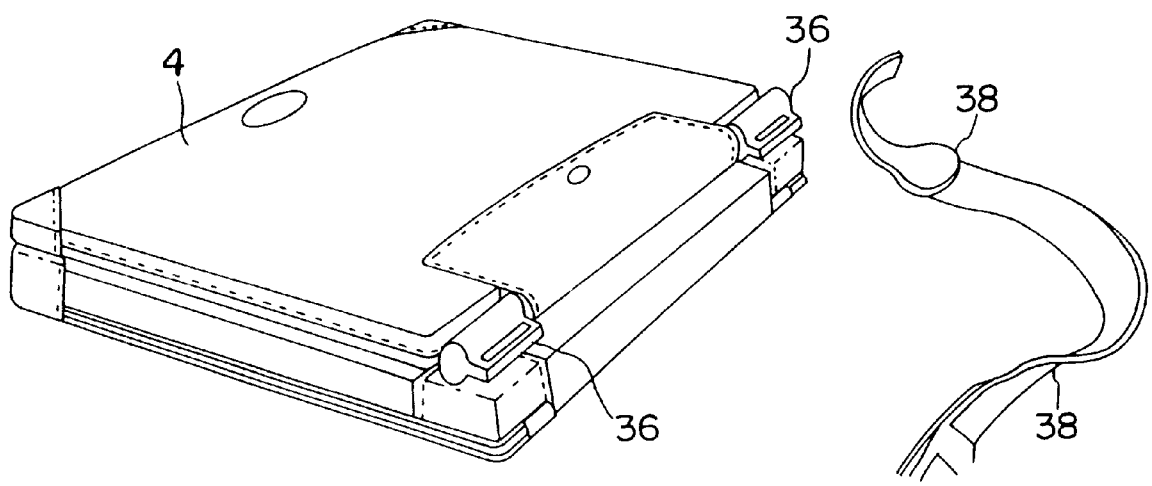
FIG. 8 is a top view of a functional enclosure panel attached to the top planar surface portion of a mobile computer.

FIG. 8 demonstrates a functional embodiment of an enclosure panel. FIG. 8 presents a top view of an enclosure panel coupled to the top planar surface of a mobile computer. The enclosure panel 4 includes fasteners 36 to hold a strap 38 wherein the strap acts as a carrying means to carry the mobile computer. The embodiment presents a belt and loop type fastening mechanism. The invention is not limited to this fastening mechanism. Rather, a person of ordinary skill in the art would recognize that virtually any fastening mechanism can suffice without deviating from the spirit and scope of the invention.

Figure 9:
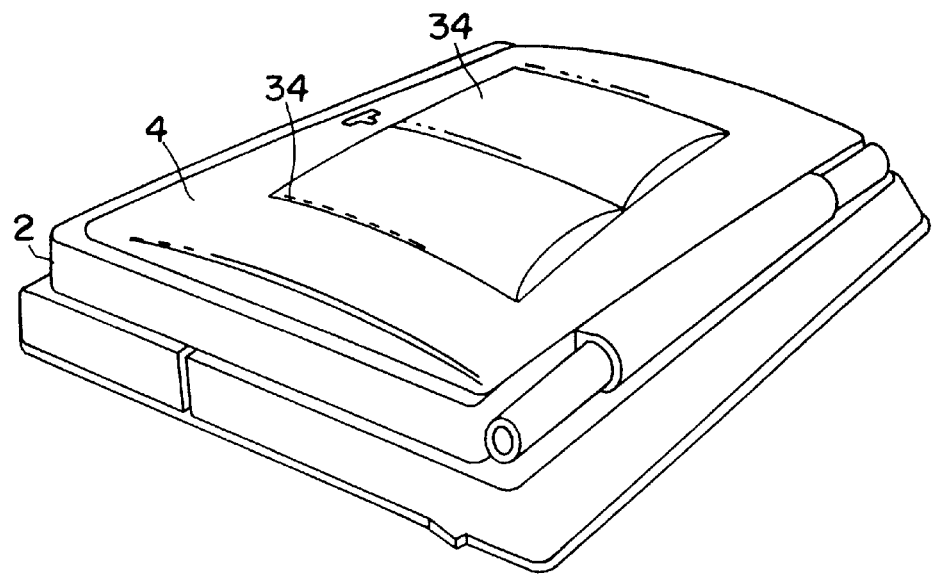
FIG. 9 is a top view of a functional enclosure panel with fasteners that hold a carrying strap, the enclosure panel attached to the top planar surface portion of a mobile computer.

FIG. 9 presents a top view of a functional enclosure panel 4 coupled to the top planar surface portion of the mobile computer 2. The enclosure panel 4 in FIG. 9 includes the functional attributes of a pair of pouches 34. The pouches 34 are attached directly to the top of the enclosure panel housing 4. Depending on their size, the pouches 34 can carry business cards, photographs, documents, manuals, battery packs, etc. The pouches 34 presented in FIG. 9 are attached directly to the enclosure panel housing 4. Suitable attachment means include, but are not limited to, glue or heat (i.e., melting together). Pouches can also be incorporated in embodiments wherein the enclosure panel housing is covered with a material, like leather, plastic, vinyl, or any textile.

Figure 10:
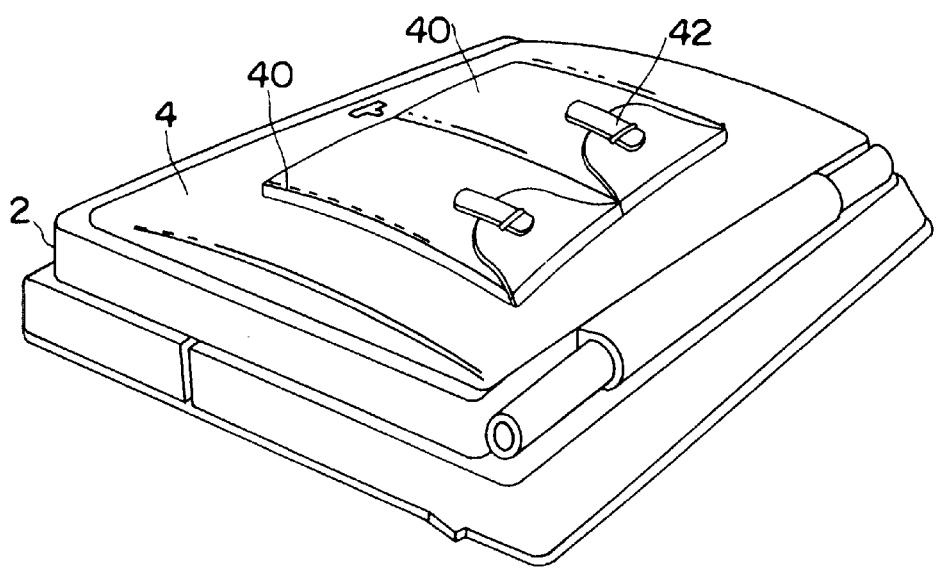
FIG. 10 is a top view of a covered functional enclosure panel wherein the covering material includes a pair of pouches.

FIG. 10 illustrates a top view of a functional covered enclosure panel 4 coupled to the top planar surface portion of the mobile computer 2. The covering of the enclosure panel in FIG. 10 includes a pair of pouches 40. Depending on their size, the pair of pouches 40 can carry documents, disks, battery packs, audio speakers, etc. The pouches 40 illustrated in FIG. 10 also contain closure means 42, that are hook and loop type fasteners, and secure the contents in the pouches during transport.

Figure 11:
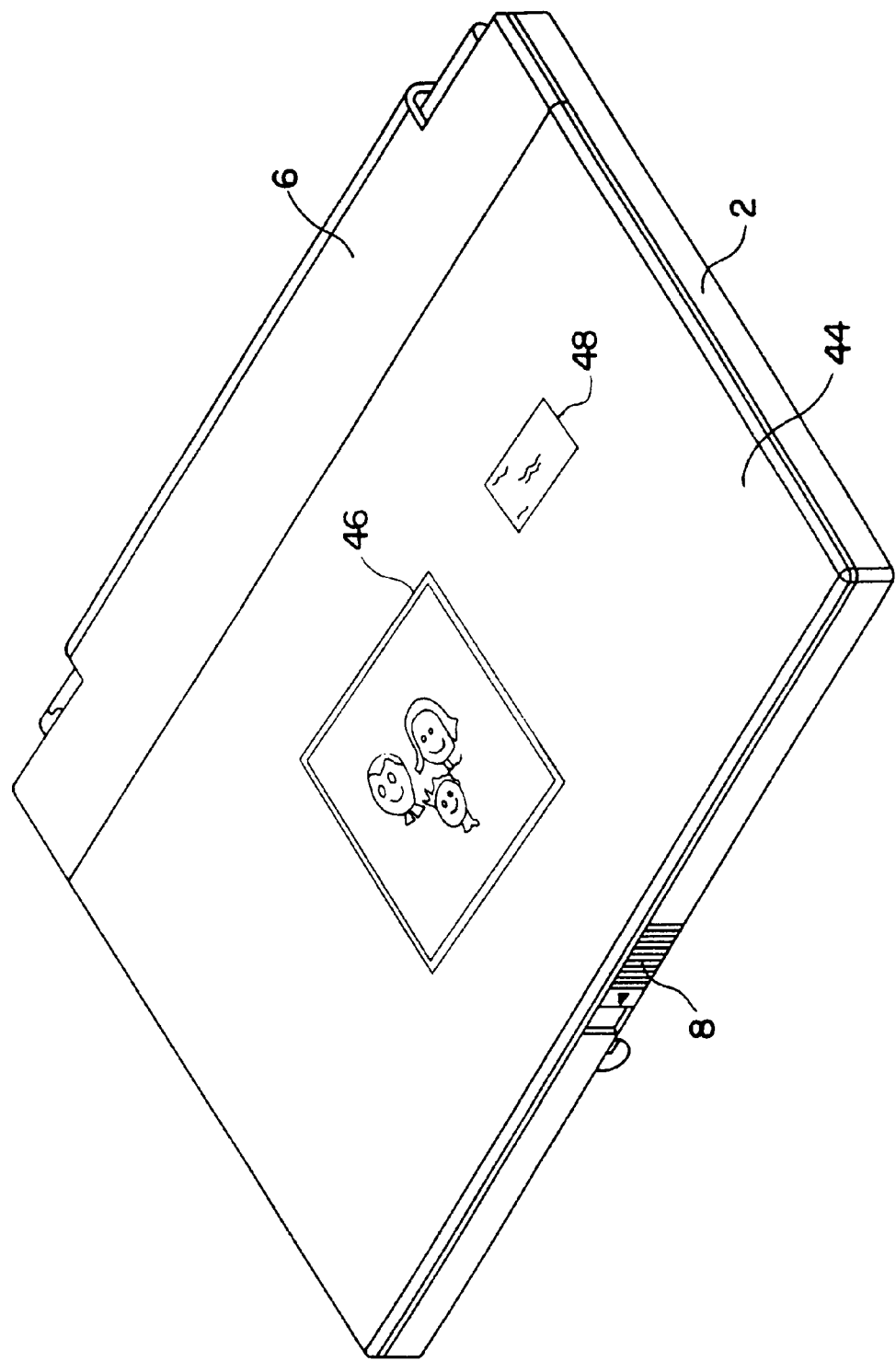
FIG. 11 is a top view of an enclosure panel that includes a transparent enclosure panel housing.

FIG. 11 presents an embodiment wherein the enclosure panel housing 4 itself serves a storage function. FIG. 11 illustrates a top view of an enclosure panel including a spine 6. The enclosure panel includes a transparent enclosure panel housing 44 attached to an attachment plate. In the embodiment presented, there is a small gap or space between the enclosure panel housing 44 and the attachment plate such that thin objects like photographs, documents, and business cards can be lodged between the enclosure panel housing 44 and the attachment plate. FIG. 11 illustrates a photograph 46 and a business card 48 beneath the transparent enclosure panel housing 44.

Figure 12:
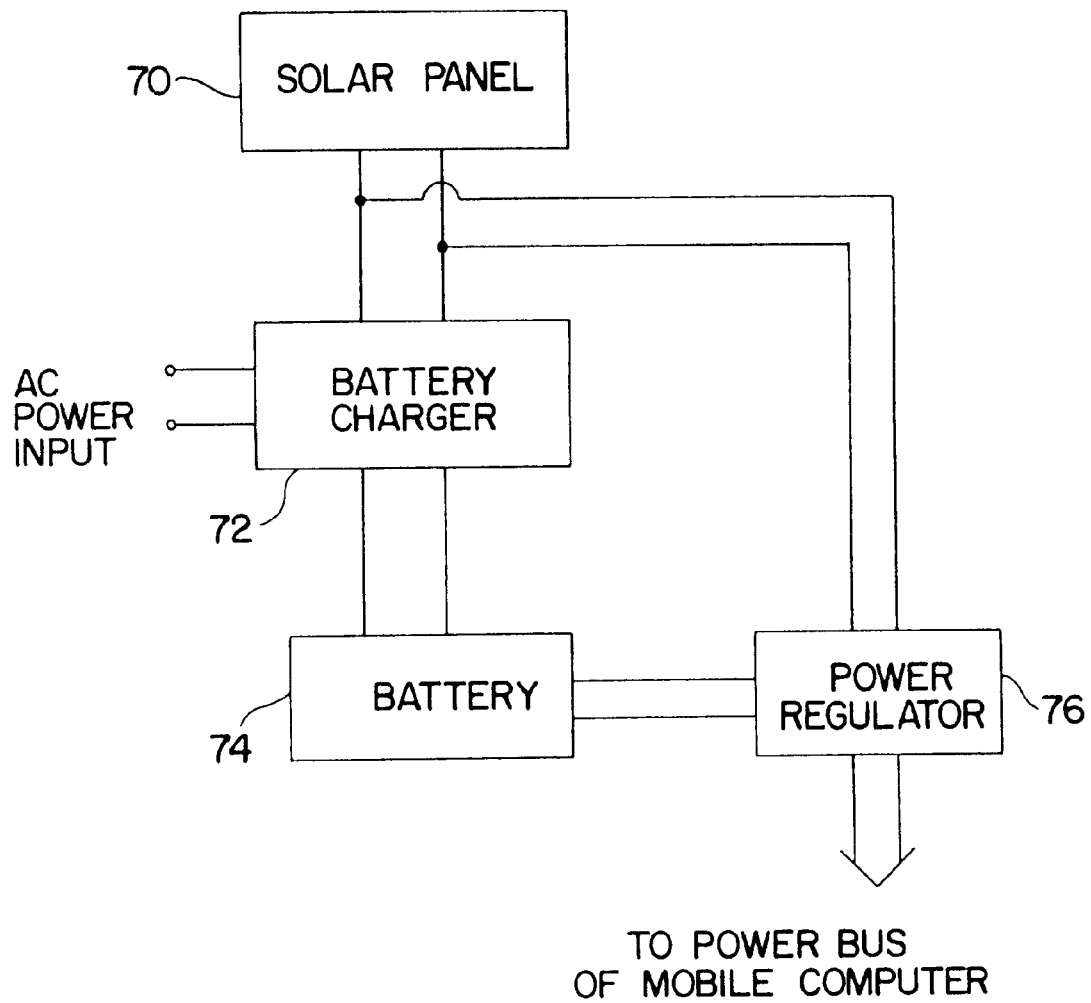
FIG. 12 is a schematic illustration of the distribution of power by way of a solar panel attached to a enclosure panel housing or a covering of an enclosure panel housing.

FIG. 12 presents a schematic illustration of the distribution of power by way of a solar panel 70 attached to an enclosure panel housing or a covering of an enclosure panel housing. FIG. 12 shows that the solar panel 70 may supply power to a charger 72, the charger in turn charging a battery 74 for a mobile computer. Alternatively, the solar panel 70 may provide power to a power regulator 76 that in turn supplies power to a power bus 78.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An enclosure panel for a mobile computer chassis comprising:
    an attachment plate having a first surface and a second surface, wherein said first surface is adapted to be coupled to an outer surface of an enclosure portion of the chassis of the mobile computer opposing a viewing surface of a display within said enclosure portion; and
    a panel housing that is coupled to said second surface of said attachment plate,
    wherein said panel housing is exchangeable for a second panel housing based on the desire of the user.

2. The enclosure panel of claim 1, wherein the panel housing comprises one of metal, plastic, wood, and fiber glass.

3. The enclosure panel of claim 1, wherein a portion of the panel housing is covered by a material comprising textile, leather, vinyl, elastomer, urethane, and plastic.

4. The enclosure panel of claim 1, wherein padding material is coupled to the panel housing, said padding material comprising one of cotton, polystyrene filler, rubber, non-reinforced vinyl, urethane, acrylic, and gel.

5. The enclosure panel of claim 4, wherein padding material is between the panel housing and the material covering the panel housing.

6. The enclosure panel of claim 1, wherein the panel housing includes a storage pouch.

7. The enclosure panel of claim 1, wherein an electronic component is coupled to the panel housing and further wherein the electronic component is adapted to be in communication with a mobile computer.

8. The enclosure panel of claim 1, wherein a solar panel is coupled to the panel housing, the solar panel adapted to be in electrical communication with a power supply of the mobile computer.

9. The enclosure panel of claim 1, wherein the panel housing includes a strap fastener.

10. A mobile computer chassis comprising:
    an enclosure portion having an opening adapted to house a display and having an outer surface opposing the opening;
    an attachment plate having a first surface and a second surface, wherein said first surface is detachably coupled to said outer surface of said enclosure portion of the chassis; and
    a panel housing coupled to said second surface of said attachment plate,
    wherein said panel housing is exchangeable for a second panel housing based on the desire of the user.

11. The enclosure panel of claim 10, wherein the panel housing comprises one of metal, plastic, wood, and fiber glass.

12. The enclosure panel of claim 10, wherein a portion of the panel housing is covered by a material comprising textile, leather, vinyl, elastomer, urethane, and plastic.

13. The enclosure panel of claim 10, wherein padding material is coupled to the panel housing, said padding material comprising one of cotton, polystyrene filler, rubber, non-reinforced vinyl, urethane, acrylic, and gel.

14. The enclosure panel of claim 13, wherein padding material is between the panel housing and the material covering the panel housing.

15. The enclosure panel of claim 10, wherein the panel housing includes a storage pouch.

16. The enclosure panel of claim 10, wherein an electronic component is coupled to the panel housing and further wherein the electronic component is adapted to be in communication with a mobile computer.

17. The enclosure panel of claim 10, wherein a solar panel is coupled to the panel housing, the solar panel adapted to be in electrical communication with a power supply of the mobile computer.

18. The enclosure panel of claim 10, wherein the panel housing includes a strap fastener.

* * * * *